April 6, 1943.  W. J. CRITES  2,315,840
BOREHOLE THERMOMETER
Original Filed July 11, 1938
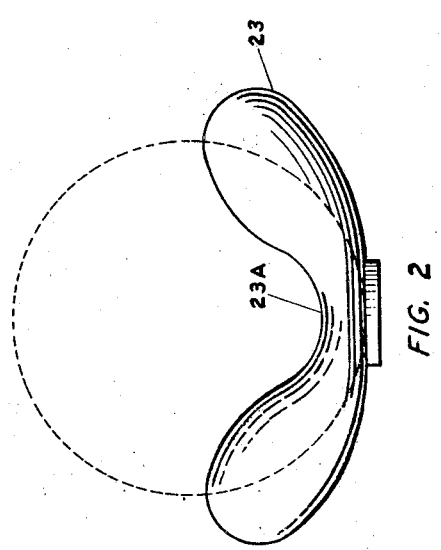
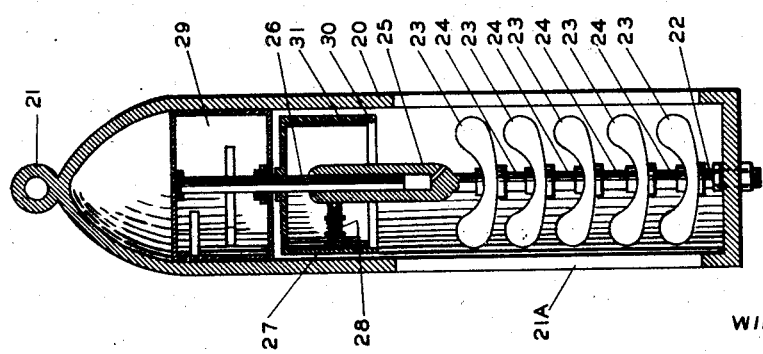
Inventor
WILBUR J. CRITES
By Hudson, Young, Shanley + Yinger
Attorney Patented Apr. 6, 1943

2,315,840

UNITED STATES PATENT OFFICE 2,315,840

BOREHOLE THERMOMETER

Wilbur J. Crites, Bartlesville, Okla., assignor to Phillips Petroleum Company, a corporation of Delaware Original application July 11, 1938, Serial No. 218,659. Divided and this application June 8, 1940, Serial No. 339,567

1 Claim. (Cl. 73—369)

This invention relates to the use of thermal expansion devices for the purpose of imparting motion. It often happens that the magnitude of the motion required is greater than the capacity of the actuating unit or if the unit is of sufficient capacity the space required is prohibitive, or the stability of the unit is such that it lacks the strength to directly operate the mechanism to which it is applied. The primary object of this invention is to afford a mechanism that is responsive to temperature changes in the translation motion to a complementary mechanism in which the actuating mechanism occupies a minimum amount of space and imparts maximum motion and force to its complement.

This application is a division of my co-pending application which resulted in Patent No. 2,213,-950, issued September 10, 1940.

The invention further relates to improvements in devices for the recording of bottom hole temperatures or the range of variation in bottom hole temperatures in the bottom of a producing oil well.

It is an object of the invention to provide a device for the above-mentioned purpose, the adjustment and operation of which is effected by thermal control means, for example, through the expansion and contraction of confined liquids under changing temperatures.

A further object of the device is to use the same as a temperature recording mechanism to determine the variation of temperature existing in the well.

With the foregoing objects outlined and with other objects in view which will appear as the description proceeds, the invention consists in the novel features hereinafter described in detail, illustrated in the accompanying drawing and more particularly pointed out in the appended claim.

In the drawing:

Figure 1 is a vertical sectional view illustrating the application of the device as a temperature recording mechanism.

Figure 2 is a side elevational view of one of the expansive members showing the approximate shape as derived from the collapsing of a sphere.

Figure 1 shows the application of the vertical movement of expansion fluid containers to a recording temperature gauge to measure the variations of temperature which may exist in the bottom of a well. A case or housing 20 is shown which may be lowered into the well on a wire line attached to the eye 21. The bottom of the housing 20 has openings or slots 21—A which allow the fluid from the well to enter the housing. Mounted in the housing 20 and supported on the bottom thereof by means of rod 22 are the mercury filled expansible containers 23. The expansible members 23 are connected together by means of coupling rods 24. The uppermost expansible container 23 has the rod 25 mounted thereon and has the shaft 26 rotatably and longitudinally slidable therein. The rod 25 has mounted on its upper end a stylus 27 backed by a coil spring 28. In the upper end of the housing 20 is a clock mechanism 29 which may be of any known design to rotate the shaft 26. Mounted on the shaft 26 and rotatable therewith is the recording cylinder holder 30 which has a wax or soft metal lining 31 around the interior of the cylinder 30. The stylus 27 contacts the wax or soft metal on the cylinder and makes a recording thereon of any variation in temperature.

The expansion fluid containers 23 are filled with mercury or any other fluid having a high coefficient of expansion and contructed as shown in Figure 2. The body of the container is made from a light gauge metal and any metal possessing the requisite strength may be employed. The body is first made in the shape of a sphere as shown in dotted line and then pressed to the final shape, whereby the design of the thermal unit is arrived at by the collapse of a sphere to the point that the collapsing surfaces come in close contact. The containers are so constructed that the valley portion 23A is the weakest portion of the container. The container is filled with mercury before the coupling member 24 is attached by welding or any other attaching means found suitable. The containers are assembled as in Figure 1 and immersed in the fluid of the well. The mercury in the containers assumes the same temperature as the liquid in the well and is likewise responsive to any change in temperature. The mercury in expanding or contracting, will exert its pressure at the weakened portion 23A and cause the wall of the container to move upwardly or downwardly as the case may be.

In the operation of the recording temperature gauge, it is first necessary to determine the bottom hole temperature by some known means in order to calibrate the expansible containers 23. Once calibrated the device is lowered into the well with the clock mechanism 29 set in motion and the device allowed to remain in the well a requisite length of time. The clock mechanism will rotate the shaft 26 which in turn will rotate the cylinder 30 keyed thereto. The stylus 27 mounted on rod 25 will remain stationary and trace a line on the wax or metal coating 31 on the cylinder 30. Any change in temperature in the well will cause expansion and contraction in the expansible containers which in turn will be transmitted to the rod 25 as a vertical movement. This vertical movement up and down of the rod 25 will carry with it the stylus 27 which in turn will trace and record its movement on the wax or soft metal 31 on the cylinder 30. In this manner a true picture of the variations in temperature in the well bottom may be had from a study of the line traced on the coating 31. Knowing the coefficient of expansion of mercury and from previous calibration of the expansible containers, the degrees of change of temperature can easily be calculated.

As many containers 23 may be used as are necessary to get the required vertical movement. The temperature differential will be slight so that small movement of each container can be expected, hence, the movement of a number of them must be added together.

From the foregoing it is believed that the construction, operation and advantages of my invention may be readily understood by those skilled in the art, and it is apparent that changes may be made in details disclosed, without departing from the spirit of the invention, as expressed in the claim.

What is claimed and desired to be secured by Letters Patent is:

A temperature gauge to record the variation in temperature in a well bore comprising a housing, thermally responsive means comprising an expansion fluid container responsive to temperature conditions in the well bore, said container assuming the shape of a collapsed sphere with the collapsed surfaces coming in close proximity with each other, the collapsed surfaces being responsive to the expansion and contraction of the fluid medium due to temperature change, coupling means mounted on the container for transmitting movement, a clock mechanism mounted in the housing having a shaft rotated by said mechanism, a record cylinder attached to the shaft, and a stylus carried by the coupling means on the container and movable therewith bearing against the recording cylinder.

WILBUR J. CRITES.